United States Patent [19]

Dodd et al.

[11] Patent Number: 5,040,613

[45] Date of Patent: Aug. 20, 1991

[54] COUNTERBALANCED SENSING WAND ASSEMBLY

[75] Inventors: Dale R. Dodd, Hampton; Michael L. Moore, Carroll, both of Iowa

[73] Assignee: Sukup Manufacturing Company, Sheffield, Iowa

[21] Appl. No.: 572,170

[22] Filed: Aug. 23, 1990

Related U.S. Application Data

[63] Continuation-in-part of Ser. No. 516,035, Apr. 27, 1990.

[51] Int. Cl.$^5$ ............................................ A01B 69/00
[52] U.S. Cl. ........................................ 172/5; 172/26; 104/244.1; 180/131
[58] Field of Search .............. 172/2, 5, 6, 26, 233, 172/430; 171/9; 56/10.2; 180/131; 280/776; 104/244.1; 318/580, 587; 364/424.01, 424.07

[56] References Cited

U.S. PATENT DOCUMENTS

| | | | |
|---|---|---|---|
| 1,868,360 | 7/1932 | Knight | 104/244.1 X |
| 2,583,897 | 1/1952 | Smeds . | |
| 2,881,712 | 4/1959 | Murphrey . | |
| 3,038,544 | 6/1962 | Richey et al. | 172/5 |
| 4,295,323 | 10/1981 | Maier et al. | 56/10.2 |
| 4,414,903 | 11/1983 | Fasse et al. | 104/244.1 |
| 4,518,043 | 5/1985 | Anderson et al. | 172/6 |
| 4,528,804 | 7/1985 | Williams | 280/776 X |
| 4,883,128 | 11/1989 | O'Neall et al. | 172/430 |
| 4,930,581 | 6/1990 | Fleischer et al. | 172/6 |

FOREIGN PATENT DOCUMENTS

| | | | |
|---|---|---|---|
| 136548 | 4/1985 | European Pat. Off. . | |
| 1285554 | 1/1962 | France . | |
| 7608295 | 10/1977 | France . | |
| 266413 | 9/1970 | U.S.S.R. . | |
| 710538 | 1/1980 | U.S.S.R. . | |
| 1297740 | 3/1987 | U.S.S.R. | 172/5 |

OTHER PUBLICATIONS

The GuideQuick Hitch Sales Brochure, Lincoln Creek Manufacturing Co., Inc.

"Stay in Line Automatically . . . with the Navigator!" sales Brochure, HR Manufacturing Co.

"Ridge-Tillage Reins in Erosion", Successful Farming, Jun. 1989.

Navigator Row Crop Guidance System, Operator's Manual and Parts Guide, HR Manufacturing Co.

(List continued on next page.)

Primary Examiner—Dennis L. Taylor
Assistant Examiner—Jeffrey L. Thompson
Attorney, Agent, or Firm—Neuman, Williams, Anderson & Olson

[57] ABSTRACT

An agricultural implement guidance control system has a counterbalanced sensing wand assembly. The wand position sensing assembly is designed to compensate for the adverse effects of operations on a field which has a side slope, i.e., slopes to the left or right of the implement as it travels in the field. Without the counterbalanced wand position sensing assembly, the wands would pivot toward the downhill side of the implement as a result of gravity acting upon the wands. Specifically, the wand position sensing assembly is designed so that the weight of the wand bracket assembly counterbalances the weight of the wands on the pivot point which is established by the rotating shaft. The wand position sensing assembly can also include a variable compensation assembly which permits the operator to adjust the counterbalance effect. The variable compensation assembly includes a shaft, a counterweight and a retention unit. The shaft is attached to the center of the U-shaped rod support. The shaft extends forward and away from the rod support to establish a moment arm through which the counterweight counterbalances the turning moment effect of the weight of the wands. The counterweight is movably attached to the shaft. The operator adjusts the effect of the counterweight by adjusting the position of the counterweight on the shaft.

38 Claims, 5 Drawing Sheets

OTHER PUBLICATIONS

Lincoln Creek Manufacturing Owner's Guide and Parts List.

Orthman Manufacturing's New MPIII Tracker Guidance System, Machinery Today, Farm Journal Jun.-/Jul. 1989.

"'Owner's Report' on Automatic Guidance Systems", Farm Show.

NAVIGATOR Row Crop Guidance System, Sales Brochure, HR MFg. Co., 1989.

SCOUT Row Crop Guidance System Sales Brochure, Fleischer Mfg. Co., Feb. 1989.

"End Cultivator Blight" article from Farm Industry News, Jul. 1989, p. 57.

"The Auto Guide System" article from Farm Journal, Apr. 1, 1989, p. 32.

AUTOGUIDE Guidance System Sales Brochures, Sukup Mfg. Co., 1989.

COUNTERBALANCED SENSING WAND ASSEMBLY

This application is a continuation-in-part of a copending application Ser. No. 07/516,035, filed on Apr. 27, 1990, which is incorporated herein by reference.

BACKGROUND OF THE INVENTION

This invention relates to a guidance system for agricultural equipment and more particularly to a counterbalanced sensing wand assembly for the guidance system.

Various agricultural machines utilize plant sensing wands mounted on the machine for sensing the position of the standing plants for various purposes. Typically, this sensing is for guidance purposes to provide a feedback signal to a machine guidance or positioning mechanism to assure proper positioning of the machine relative to a row of such plants. By way of example, such sensors and guidance systems may be utilized on cultivating equipment.

The sensing wands are affixed to a rotatable shaft. The shaft and wand may be biased to a predetermined angular position. As the wands contacts the crop, its angular position is adjusted whereby the angular position of the shaft reflects the sensed position of the crop relative to the machine.

The adjustment of the angular position provides an electronic signal to the guidance control system which provides output for connective action to the guidance mechanism. The guidance mechanism will adjust the movement of the implement or its relative components to affect lateral adjustment thereof and thereby also will move the sensing wands relative to the crops.

Often operators must use the wand sensing assembly on a field which has a side slope, i.e. slopes to the left or right side of the implement as it travels along the field. The wands would pivot toward the downhill side of the implement as a result of gravity acting upon the wands. This unintended pivoting of the wands would provide an electronic signal to the control system which would cause the guidance mechanism to incorrectly steer the cultivator. Consequently, the guidance system would not operate properly on a field which had a side slope.

One object of this invention is to provide counterbalanced sensing wand assembly for a guidance system.

Another object of this invention is to provide a counterbalanced sensing wand assembly which will permit adjustment of the counterbalanced sensing wand assembly.

Another object of this invention is to provide a counterbalanced sensing wand assembly which is rugged, highly reliable, uses a minimum of component parts and is economical to manufacture.

Other objects and advantages of the invention will become apparent upon reading the following detailed description and appended claims, and upon reference to the accompanying drawings.

SUMMARY OF THE INVENTION

The aforementioned requirements and objects are satisfied through the counterbalanced sensing wand assembly of this invention. The wand sensing assembly is mounted to the agricultural implement by a bracket assembly which extends in front of the implement and provides orthogonal, vertical and horizontal positioning adjustment of the sensor assembly. A horizontal bracket slides within a sleeve to permit lateral adjustment of the wand sensing assembly and is held in position by set screws. A vertical bracket slides within a sleeve on the horizontal bracket to permit vertical adjustment of the wand sensing assembly and is held in position by bolts.

A support bracket for the wand position sensor is attached to the lower end of the vertical bracket and supports the wand position sensor mechanism. The latter mechanism includes a fixed housing, a pivotable support for the wands and a sensor for responding to the relative angular position of the wand support relative to the housing.

The wand sensor includes a vertical shaft which extends downward and is attached to the wand bracket. The wand bracket is U-shaped and has two sets of holes on each leg of the bracket. A support rod can be inserted into either the upper or lower holes. The wands are attached to each end of the support rod. The wands can be positioned to sense off of one row of small crops or between two rows of larger crops.

As disclosed further in previously noted copending application Ser. No. 07/516,035, a collar is attached to the upper end of the shaft which is located inside the fixed sensor housing, and affixed to the collar is a photoelectric light source. The light source projects a beam of light at a pair of photoelectric sensors which are mounted inside the housing. In the zero or null calibration setting the beam of light should shine between the photoelectric sensors.

When the sensing wands are displaced, the shaft is rotated in the corresponding direction and activates the respective photoelectric sensor. The photoelectric sensor provides an electronic signal to the guidance control system which provides output for corrective action to the guidance mechanism. The guidance mechanism will adjust the movement of the implement or its relevant components to effect lateral adjustment thereof and thereby also will move the sensing wands relative to the crops. The movement of the wands will eventually project the beam of light to the null calibration setting which is between the photoelectric sensors.

The wand position sensing assembly is designed to compensate for the adverse effects of operations on a field which has a side slope, i.e., slopes to the left or right of the implement as it travels in the field. Without the counterbalanced wand position sensing assembly, the wands would pivot toward the downhill side of the implement as a result of gravity acting upon the wands. Specifically, the wand position sensing assembly is designed so that the weight of the wand bracket assembly, which includes the wand support rod and the U-shaped support bracket, counterbalances the weight of the wands about the pivot point which is established by the rotating shaft.

The wand position sensing assembly can also include a side slope compensation assembly which permits the operator to adjust the counterbalance effect. The side slope compensation assembly includes a shaft, a counterweight and a retention nut. The shaft is attached to the center of the U-shaped rod support. The shaft extends forward and away from the rod support to establish a moment arm for the counterweight to counterbalance the turning moment of the wands about the axis of the wand support shaft. The counterweight is movably attached to the shaft. In one particular embodiment, the counterweight has a threaded aperture and is threaded onto a threaded shaft.

The operator adjusts the effect of the counterweight by adjusting the position of the counterweight on the shaft. If more counterbalance effect is needed, the operator positions the counterweight at the distal end of the shaft. Conversely, if less counterbalance effect is needed, the operator positions the counterweight at the base of the shaft near the support. In one particular embodiment the operator adjusts the position of the counterweight by turning the counterweight in a clockwise or counterclockwise direction to achieve the appropriate movement of the counterweight.

It should be understood that the drawings are not necessarily to scale and that an embodiment is sometimes illustrated in part by schematic and fragmentary views. It should be understood, of course, that the invention is not necessarily limited to the particular embodiments illustrated herein.

DESCRIPTION OF THE PREFERRED EMBODIMENT

Figure 1:
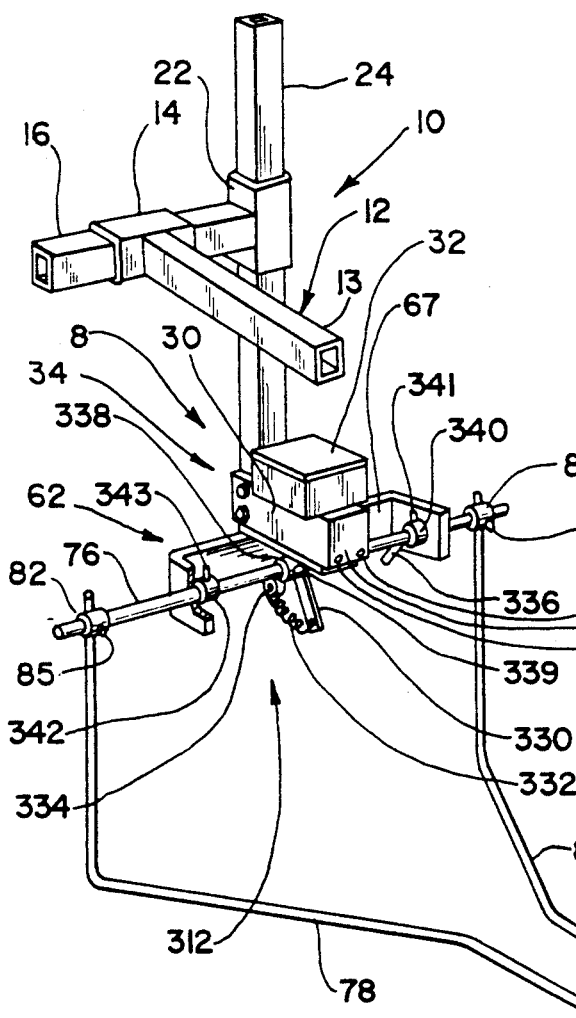
FIG. 1 is a rear perspective view of the wand position sensing assembly.

Referring to FIG. 1, the wand position sensing assembly 8 is supported by a bracket assembly 10 which is fixedly mounted on an appropriate frame element of an agricultural implement. The implement is not otherwise illustrated. It will be appreciated that the implement may be a row-crop cultivator or any other implement where accurate lateral positioning of the implement relative to rows of plants, ridges or other guidance references is important to the desired to optimum utilization and operation of the implement. As is known in this art, the purpose of the wand position sensor is to provide an output control signal corresponding to the instantaneous lateral position of the implement relative to the row reference. That control signal is derived from the position of the wands relative to the mechanism on which it is mounted. The control signal indicates the relative rotational position of the wands in a horizontal plane as the distal ends of the wands contact the plants or other row reference indicia. The control signal also indicates the relative rotational position of the wands as the implement frame shifts back and forth laterally of the rows due to variations in the guidance of the implement, field conditions, or the like.

The output control signal from the sensor typically serves as an input to an appropriate indicator or power control mechanism for assisting in or affecting the lateral positioning of the implement to an optimum operational position relative to the crop rows. For example, the output may drive a visible indicator observed by the operator of the implement or a towing tractor for appropriate corrective manual guidance to seek the optimum positioning of the implement. Alternatively, the output may be used as an input to an automatic power guidance mechanism for affecting automatic lateral adjustment of the implement relative to the sensed row or rows of crop plants. One type of guidance mechanism is shown in U.S. patent application Ser. No. 07/424,701 which was filed on Oct. 20, 1989. However, there are many types of guidance mechanisms which are well known in the art.

The bracket assembly 10 provides orthogonal vertical and horizontal adjustable support for the sensor assembly 8 and includes a first horizontal bracket 12 which is affixed to the implement frame (not shown). The bracket 12 includes a laterally extending holder sleeve 14 at the forward end of support arm 13.

The sleeve 14 accepts another horizontal bracket arm 16. The horizontal bracket arm 16 slides laterally within the sleeve 14 to permit lateral adjustment of the sensing assembly 8 and is held in a selected position by set screws (not shown). A vertical sleeve 22 is attached to the end of the horizontal bracket arm 16. The sleeve 22 accepts a vertical bracket arm 24. The vertical bracket arm 24 slides within the sleeve 22 to permit vertical adjustment of the sensing assembly 8 and is held in a selected position by set screws (not shown).

Figure 4:
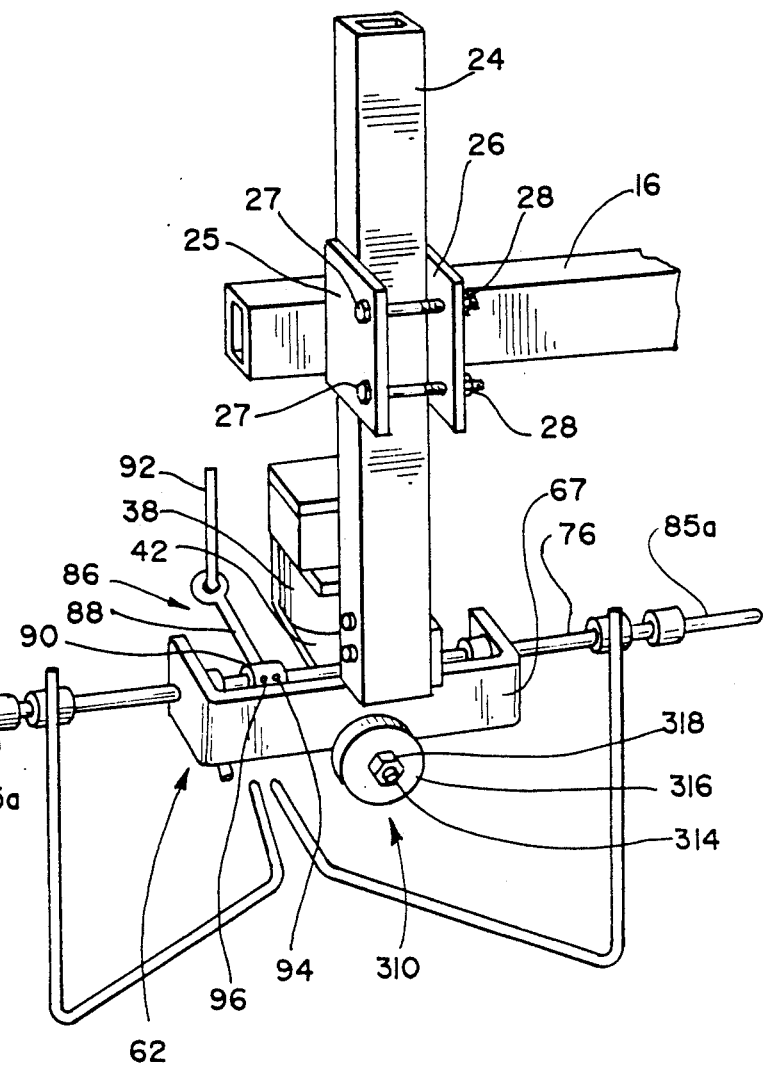
FIG. 4 is a perspective view of the wand sensing assembly.

Another method of permitting adjustment of the bracket arms 12, 16 and 24 is the use of squeeze plates 25 and 26 as shown in FIG. 4. The squeeze plates 25 and 26 are welded or attached to the bracket arm 16. The bracket arm 24 is positioned between the squeeze plates 25 and 26 and bolts 27 are inserted into holes or apertures in the squeeze plates. Finally, nuts 28 are threaded onto the ends of the bolts 27. The vertical bracket arm 24 slides between the squeeze plates 25 and 26 to permit vertical adjustment of the sensing assembly 8 and is held in a selected position by tightening the bolts 27 and nuts 28. Of course, these squeeze plates can be substituted for sleeve 14.

The wand position sensing assembly 8 includes a support bracket 30 and housing 32 and a wand support assembly 34 which is pivotably supported therefrom. The housing is mounted on the bracket 30, as by screws and the bracket 30 is affixed to the lower portion of the arm 24 whereby the housing 32 remains in fixed position relative to the bracket assembly 10 and hence relative to the implement. The bracket 30 is generally L-shaped in cross section and has a front plate 35. A vertical bearing sleeve 38 also is affixed to the bracket 30 and/or to the housing 32 for rotatably supporting the pivoting assembly 34.

Figure 2:
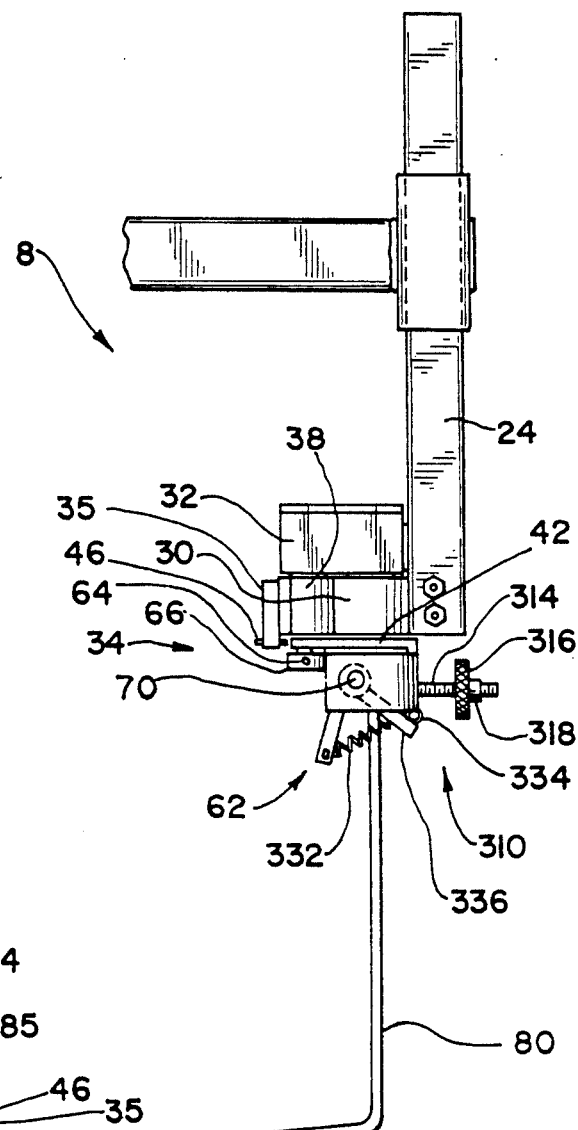
FIG. 2 is side elevational view of the wand position sensing assembly. The wand position sensing assembly is shown without one of the sensing wands.
Figure 6:
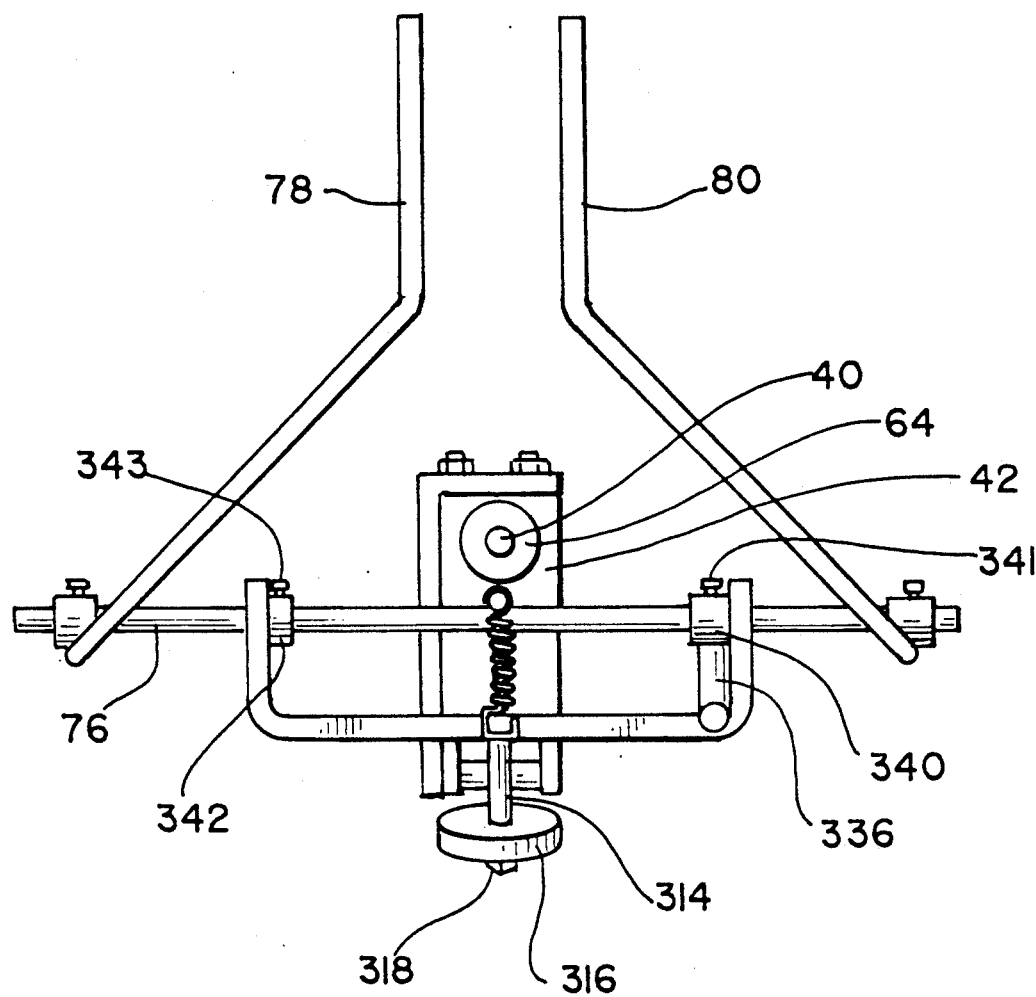
FIG. 6 is a bottom view of the wand sensing assembly.

The pivoting assembly 34 includes a vertical shaft 40 (see FIGS. 6 and 7) which extends downward into sleeve 38. Appropriate bearings, not shown, rotatably support the shaft 40 in the sleeve 38 and thereby pivotably support the assembly 34. As shown in FIGS. 2 and 6, the shaft 40 extends beyond the sleeve 38 and is attached to the top plate 42 of a wand bracket assembly 62. The axis of shaft 40 defines a generally vertical pivot axis which permits horizontal pivotal movement of the wand bracket assembly 62. Specifically, the wand bracket 62 includes a collar 64 which is welded or affixed to the underside of plate 42 and the collar 64 has two holes which accept a roll pin 66. The collar 64 is positioned around the shaft 40 and is connected to the shaft by the roll pin 66.

The front plate 35 of support bracket 30 extends downward and in front of top plate 42. The front plate 35 has stops 44 and 46 which extend through the front plate 35 toward the front of top plate 42. The wand bracket assembly 62 can rotate approximately four (4) degrees from the center position before the front of top plate 42 contacts one of the stops 44 or 46. This arrangement prevents the wand bracket 62 from rotating more than eight (8) degrees so that the wands are maintained in the proper general orientation.

The wand bracket assembly 62 also includes a U-shaped rod support 67 which has holes 70 and 74 on each leg of the bracket. (See FIGS. 2 and 3). A wand support rod 76 is inserted into the holes 70 and 74. The wand bracket assembly 62 provides a support structure for the sensing wands 78 and 80. The wands 78 and 80 are attached to each end of support rod 76. Specifically, the collars 82 and 84 are welded or otherwise affixed to the upper ends of the wands 78 and 80, respectively. The collars 82 and 84 are positioned onto each end of the wand support rod 76 and the distance between the wands 78 and 80 is adjusted horizontally for the particular crop. The wands 78 and 80 are attached to the support rod 76 by set screws 85 in the collars 82 and 84. The set screws are loosened to adjust the position of the wands and tightened when the wands are in the desired position. As shown in FIG. 4, extension rods 85a can be attached to the ends of support rod 76 to increase the length of support rod 76. The wands 78 and 80 extend generally in a horizontal direction radially away from the pivot axis established by shaft 40.

Referring to FIG. 4, a wand lift assembly 86 is used to raise and lower the wands 78 and 80 which may be used when the operator turns the implement at the end of the field. By raising the wands, the wands and wand sensing assembly will not be damaged by debris and other obstacles which can exist at the end of the field. The wand lift assembly 86 includes an eyebolt lever arm 88, a collar 90, and a lift cable 92. The eyebolt lever arm 88 is attached to the wand support rod 76. The lever arm 88 has a collar 90 which is welded or affixed to the end of the lever arm 88 and the support rod 76 is positioned inside the collar 90. The collar 90 includes two set screws 94 and 96 which are tightened to hold the lever arm 88 in the desired position relative to the support rod 76.

The lift cable 92 is attached to the eyebolt portion of the lever arm 88. The cable 92 is then routed through a series of appropriately located pulleys (not shown) so that the cable 92 can be acted upon by mechanical or manual means. When the cable is pulled upwards, the lever arm 88 will move upwards and cause the wand rod support 76 to rotate. As the wand rod support 76 rotates, the wands 78 and 80 are raised upward away from the debris or other obstacles. After the operator has completed the turn at the end of the field and is ready to use the wand position assembly, the cable 92 is released and the wands 78 and 80 automatically lower to the normal operating position.

Figure 8:
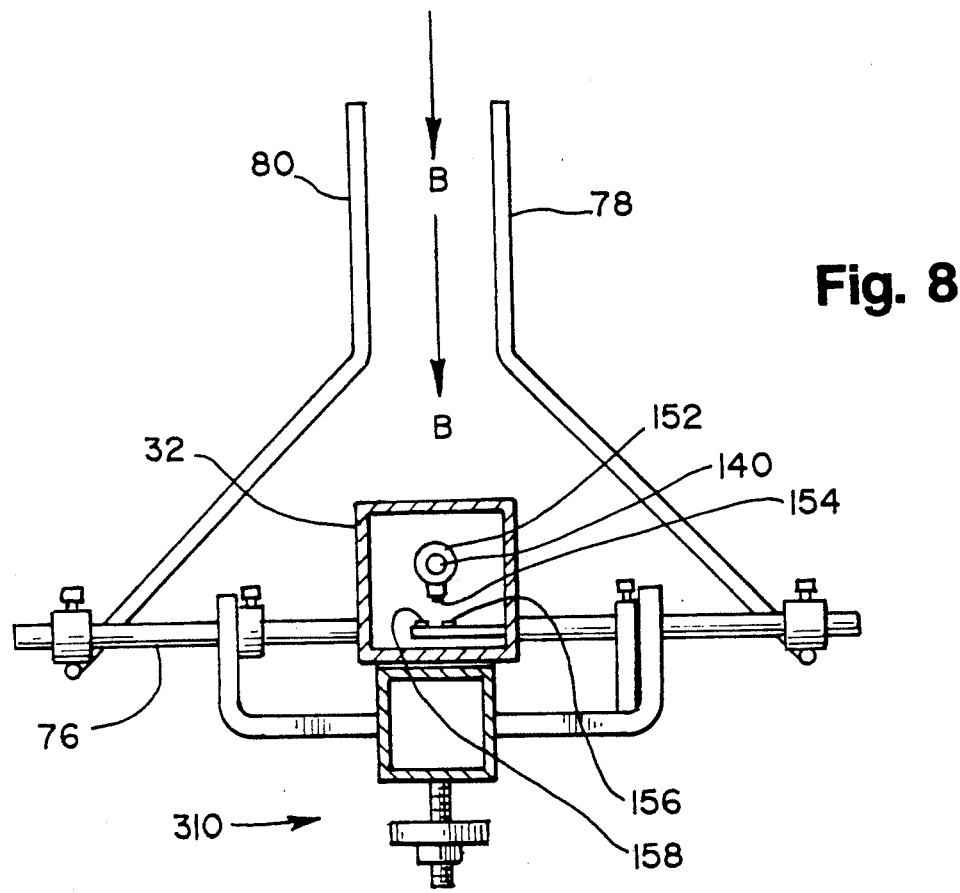
FIG. 8 is a sectional top plan view of the wand sensing assembly of FIG. 5 along line 8.

Referring to FIG. 8, a collar 152 is attached to the upper end of the support pivot shaft 40, within housing 32, and affixed to the collar is a photoelectric light source 154. The light source 154 projects a narrow beam of light toward a pair of photoelectric sensors 156 and 158. The photoelectric sensor 158 represents the right displacement for the sensing wands and the photoelectric sensor 156 represents the left displacement of the sensing wands. In the zero or null position of the wands, the beam of light should shine between the photoelectric sensors 156 and 158.

When the position of the implement varies to the left (from the view if one were facing in the direction of travel) relative to the crop row being cultivated or otherwise treated, the trailing ends of the sensing wands 78 and 80 are displaced to the right. The shaft 40 thereby is rotated in the corresponding direction and activates the photoelectric sensor 158. The photoelectric sensor 158 provides an electronic signal to the guidance controls (not shown). The guidance controls receive the signal and provide output for corrective action to the guidance indicator or mechanism which affects lateral adjustment of the implement. The guidance mechanism will then affect lateral adjustment of the implement which will move the sensing assembly 8 relative to the crops. The resulting relative movement of the wands 78 and 80 will eventually project the beam of light to the null calibration setting which is between the photoelectric sensors 156 and 158.

Similarly, when the sensing wands are displaced to the left, the shaft 40 is rotated in the corresponding direction and activates the photoelectric sensor 156. The photoelectric sensor 156 provides an electrical signal to the guidance controls which provide corresponding output for corrective action. An adjustable assembly for the calibration of the guidance system and, more specifically, for the photoelectric sensors is shown in the aforementioned U.S. patent application Ser. No. 07/516,035.

Referring to FIGS. 1 and 4, the wand position sensing assembly 8 includes a side slope compensation assembly 310 to compensate for the adverse effects of operations on side slopes and a wand down-force assembly 312 which applies a downward force on the sensing wands 78 and 80.

Figure 7:
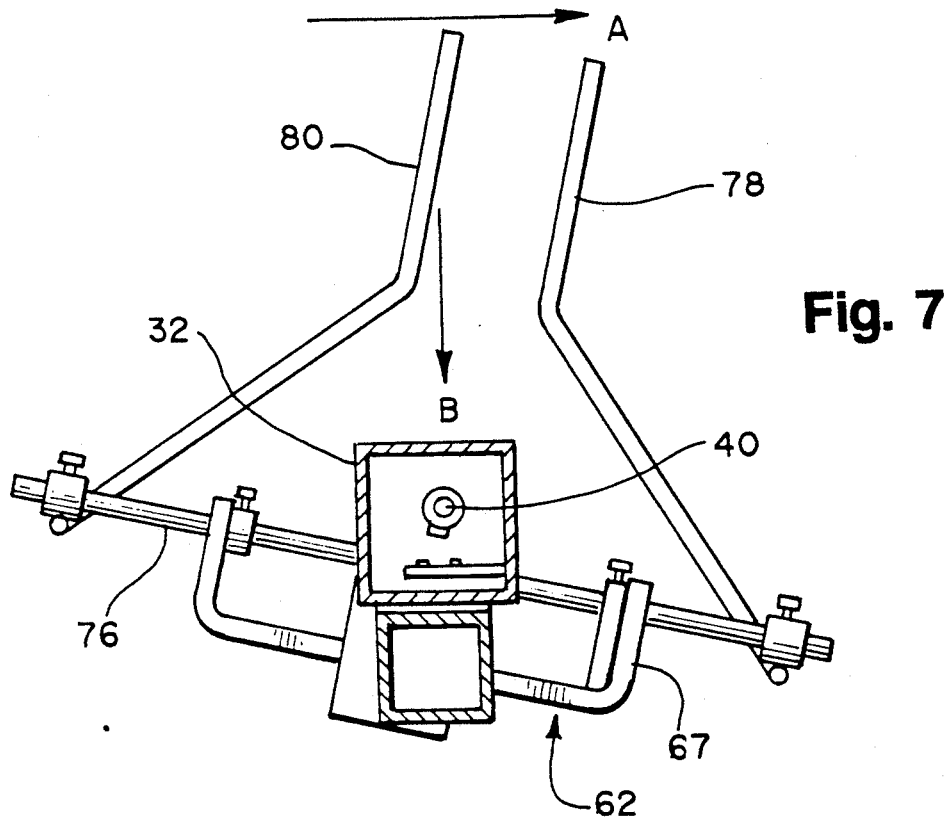
FIG. 7 is a sectional top plan view of a wand sensing assembly which is not counterbalanced and when the implement is in a field which is downwardly sloping in the direction of arrow A.

Often operators must use the wand sensing assembly on a field which has a side slope, i.e. slopes to the left or right side of the implement as it travels in the field. For example, referring to FIGS. 7 and 8, the field has a downward slope in the direction of the arrow A and the implement is traveling in the direction of the arrows B. As shown in FIG. 7, if the wand sensing assembly is not counterbalanced or does not have a side slope compensation assembly, the wands would pivot toward the downhill side of the implement (i.e., in the direction of the arrow A) as a result of gravity acting upon the wands. As shown in FIG. 8, a counterbalanced wand sensing assembly which may contain a side slope compensation assembly 310 counterbalances the weight of the wands and negates the effect of gravity on the wands caused by the slope in the field. Thus, the wands are not affected by gravity and will remain oriented in the direction of travel, i.e. parallel to crop which is in the direction of arrow B.

As shown in FIG. 7, in order to counterbalance the wands, the wand bracket assembly 62 is mounted in front of the pivot axis which is established by the shaft 40. This arrangement allows the weight of the wand bracket assembly 62, which includes, among other components, the U-shaped rod support 67 and the wand support rod 76, to counterbalance the weight of the wands 78 and 80 on the pivot axis which is established by the shaft 40. In other words, the sensing wands 78 and 80, which extend generally in a horizontal direction radially away from the pivot axis, are counterbalanced by the components which are attached to the wands and are disposed on the opposite side of the pivot axis. When balanced properly this arrangement will provide a counterbalanced wand sensing assembly. However, this arrangement will not permit the operator to adjust the counterbalance effect without modifications to the assembly.

Figure 3:
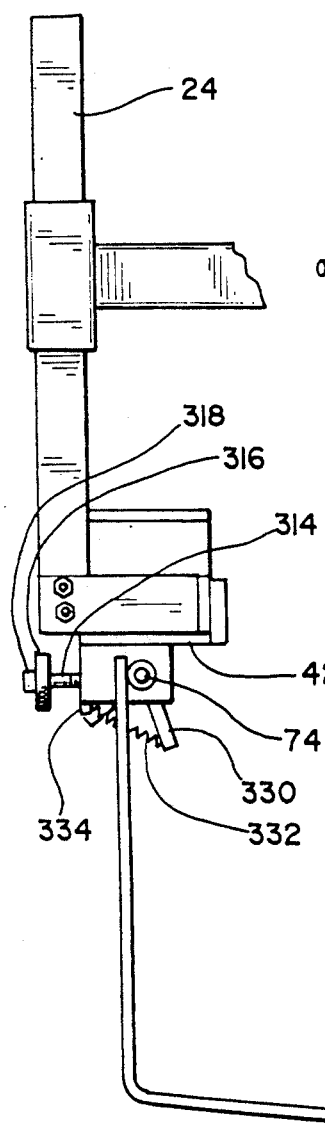
FIG. 3 is another side elevational view of the wand sensing assembly of FIG. 1.

In order to provide an adjustable counterbalance means, the side slope compensation assembly 310 is included in the wand sensing assembly. As shown in FIGS. 3 and 4, the adjustable side slope compensation assembly 310 includes a threaded shaft or support arm 314, a counterweight 316 and a retention nut 318. The threaded shaft or support arm 314 is attached to the center of U-shaped rod support 67. Specifically, the threaded shaft 314 is screwed into a threaded opening in the U-shaped rod support 67. The shaft 314 extends forward and away from the rod support 67 to establish a moment arm for the counterweight 316 to counterbalance the turning moment of the wands 78 and 80. The counterweight 316 is movably attached to the shaft or support arm 314. In this particular embodiment, the counterweight 316 has a threaded aperture and the counterweight 316 is threaded onto the shaft 314.

In an alternative embodiment, the wand bracket assembly 62, which includes the rod support 67 and the wand support rod 76, would be centered on the pivot axis. The side slope compensation assembly 310 would extend forward and away from the wand bracket assembly 62 to counterbalance the turning moment of the wands 78 and 80. In another embodiment, the wand bracket assembly 62 would be positioned on the same side of the pivot axis as the distal ends of wands 78 and 80. The side slope compensation assembly 310 would extend forward and away from the wand bracket assembly 62 to counterbalance the turning moment of both the wand bracket assembly 62 and the wands 78 and 80.

The counterweight 316 is positioned on the shaft or arm 314 so that the weight counterbalances the weight of the wands 78 and 80 and the wand assembly when the wand position sensing assembly 8 is used on a field which has a side slope. The operator adjusts the effect of the counterweight by adjusting the position of the counterweight 316 on the shaft or arm 314. If more counterbalance effect is needed, the operator positions the counterweight at the distal end of the shaft 314. Conversely, if less counterbalance effect is needed, the operator positions the counterweight at the base of the shaft 314 near the rod support 67. In this particular embodiment the operator adjusts the position of the counterweight 316 by turning the counterweight in a clockwise or counterclockwise direction to achieve the appropriate axial movement of the counterweight along the threaded shaft.

Since the counterweight 316 threadably engages the shaft or arm 314, the rotation of the counterweight 316 causes the counterweight to move along the length of the shaft in the appropriate direction. After the operator has selected the appropriate position for the counterweight 316 on the shaft or arm 314, the retention nut 318 is positioned and tightened against the counterweight 316 to prevent the counterweight 316 from further moving along the shaft or arm 314. If the position of the counterweight needs to be adjusted, the retention nut 318 is loosened and the counterweight 316 is adjusted to the appropriate position.

The side slope compensation assembly 310 is used to balance the sensing wand assembly for variations which occur in the manufacturing process. For example, the weight and shape of the wand assembly components can vary slightly due to differences in materials and manufacturing tolerances. These variations can result in an unbalanced wand sensing assembly. If the sensing wand assembly did not have an adjustable weight member, an additional manufacturing operation or procedure would be required for each assembly in order to balance the assembly. With the adjustable weight member, the manufacturer does not need to precisely balance each assembly because the operator can balance the assembly prior to using the assembly in the field. Thus, the adjustable weight member reduces manufacturing costs and allows the operator to precisely balance the sensing wand assembly prior to each usage of the assembly.

Furthermore, the side slope compensation assembly 310 is also necessary if the operator replaces the wands 78 and 80 with wands which have a different length or configuration. Specifically, the operator could remove the wands 78 and 80 and attach wands which were longer or shorter than the wands 78 and 80. Similarly, the operator could attach wands which have a different shape or configuration than the wands 78 and 80. These changes could result in an increase or decrease in the moment arm created by the wands. Thus, the adjustable weight member permits the operator to adjust the position of the weight 316 so that the assembly is properly balanced for side slope operation.

Finally, the side slope compensation assembly 310 is beneficial when the operator changes the angle of the wands 78 and 80. Due to the adjustability of the wands 78 and 80, the wands can be positioned in several different orientations with respect to the surface of the field. More specifically, the wands can be oriented so that the distal ends of the wands are angled downward, parallel to the ground, or angled upward. The operator adjusts the angle of the wands 78 and 80 by loosening the set screws 85 on collars 82 and 84. The operator then positions the wands 78 and 80 at the desired angle and tightens the set screws 85 to secure the wands in the desired position.

However, the moment arm created by the wands on the pivot point will vary depending on the angle of the wands. Specifically, if the operator orients the wands so that the distal ends of the wands are angled downward, the moment arm created by the wands will decrease. This decrease in the moment arm occurs because a portion of the weight of the wands is shifted to the opposite side of the pivot axis. Similarly, if the operator orients the wands so that the distal ends of the wands are angled upward, the moment arm created by the wands will increase. Therefore, when the operator changes the angle of the wands, the operator must also adjust the position of the counterweight 316 so that the wand position sensing assembly 8 is properly counterbalanced for side slope operation.

The wand down-force assembly 312 applies a downward force on the ends of the sensing wands 78 and 80. Often the wands are positioned near the base of the plants or crops and therefore the wands may encounter debris, dirt clumps and other obstacles which would cause unintended vertical pivotal movement of the wands. The debris and other obstacles would cause the wand to move from the row crop and out of position. The down-force assembly exerts a downward pressure on the wands and negates the effects of debris and other obstacles which may inadvertently pivot the wands upward.

Figure 5:
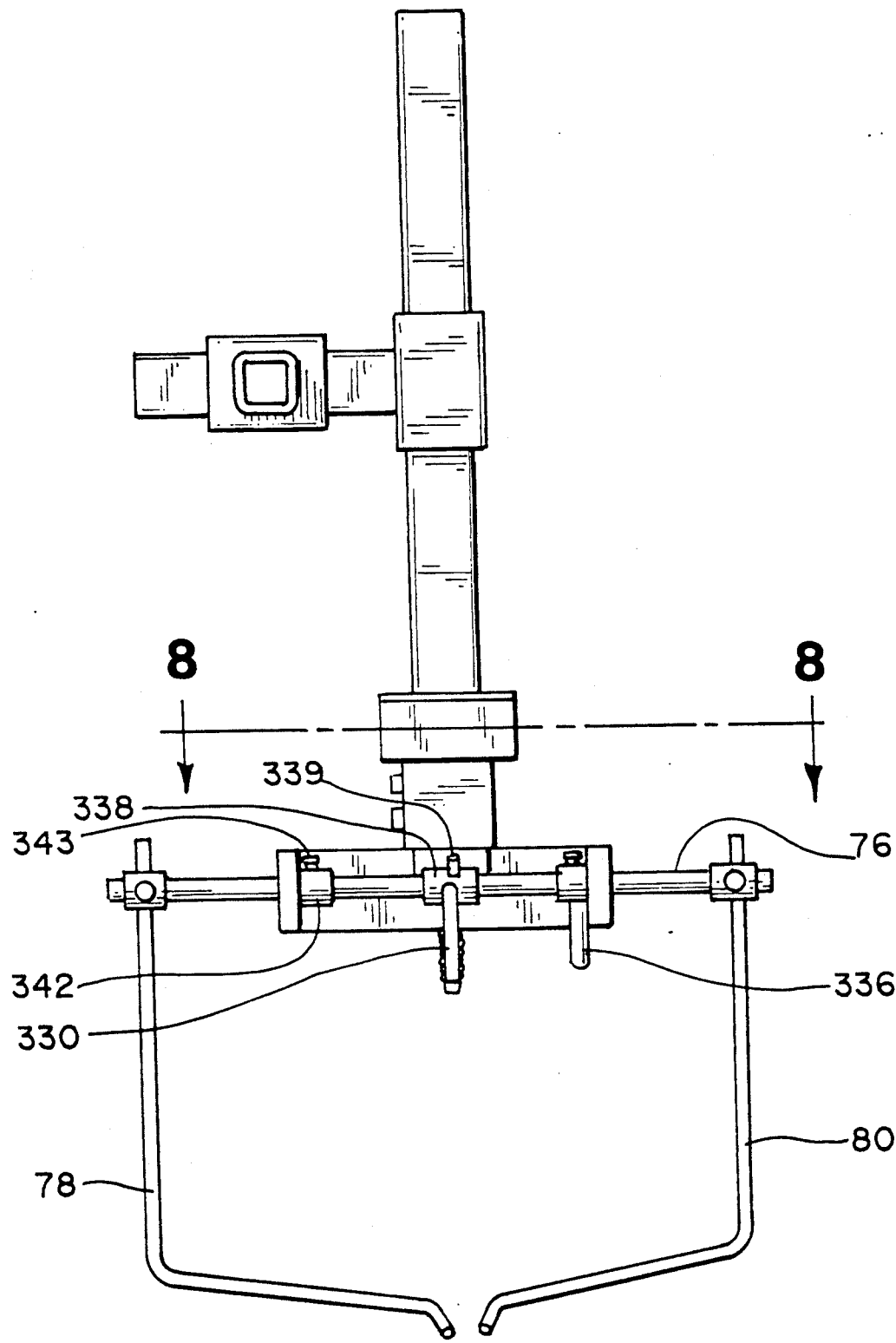
FIG. 5 is a rear elevational view of the wand sensing assembly.

The wand down-force assembly 312 includes a leverage arm 330, a coiled tension spring 332, a spring attachment member 334 and a stop arm 336. The leverage arm 330 is attached to the wand support rod 76. In this particular embodiment, the leverage arm 330 has a collar 338 which is welded or affixed to the leverage arm 330 and the support rod 76 is positioned inside the collar 338. The collar 338 includes a set screw 339 which is tightened to hold the leverage arm 330 in the desired position relative to the support rod 76. The spring attachment member 334 is affixed to the underside of the U-shaped rod support 67. In this particular embodiment, the spring attachment member 334 is a nut which is welded to the underside of the support 67. As shown in FIGS. 1 and 5, the leverage arm 330, tension spring 332 and spring attachment member 334 are centered on the wand support rod 76. However, these components can be located at any position on the wand support rod 76 between the legs of bracket 67.

One end of the tension spring 332 is attached to the spring attachment member 334 and the other end of the spring 332 is attached to an opening in the distal end of leverage arm 330. The spring 332 is in tension and exerts a pulling force on the leverage arm 330. The spring 332 acting through the leverage arm 330 causes the support rod 76 to rotate in a counterclockwise or a downward direction. (See FIG. 2). A stop arm 336 is attached to the wand support rod 76. In this particular embodiment, the stop arm 336 has a collar 340 which is welded or affixed to the end of the stop arm 336 and the support rod 76 is positioned inside the collar 340. The collar 340 includes a set screw 341 which is tightened to hold the stop arm 336 in the desired position relative to the support rod 76. The stop arm 336 is positioned so that the stop arm 336 contacts the U-shaped rod support 67 during normal operation. The stop arm 336 is held in contacting position with the rod support 67 due to the weight of the wands 78 and 80 and the counterclockwise rotation of support rod 76 which is caused by spring 332 acting through leverage arm 330. (See FIG. 2).

The stop arm 336 and collar 342 prevent the support rod 76 from excessive horizontal movement relative to U-shaped rod support 67. The stop arm 336 is positioned on the support rod 76 near one of the legs of the U-shaped rod support 67. The collar 342 is positioned on the rod support 76 near the other leg of the U-shaped rod support 67. The collar 342 includes a set screw 343 which is tightened to hold the collar 342 in the desired position relative to the support rod 76. Thus, the collar 342 and stop arm 336 capture the support rod 76 so that it has minimal horizontal movement relative to U-shaped rod support 67 without the stop arm 336 and collar 342 binding on the legs of rod support 67.

The wands 78 and 80 may encounter debris and other obstacles which would cause unintended movement of the wands. When the wands 78 and 80 encounter an obstacle without the down force assembly, the wands would move upwards and cause the support rod 76 to rotate in a clockwise direction as seen in FIG. 2. In order to reduce or eliminate the rotational movement of the support rod 76 when the wands 78 and 80 encounter an obstacle, the spring 332 exerts a counterclockwise rotation on the support rod 76 and concomitantly a downward force on the ends of wands 78 and 80. If the wands 78 and 80 encounter an obstacle which exerts an upward force on the wands greater than the downward force exerted by the spring 332 acting through the leverage arm 330, the support rod 76 will rotate in a clockwise direction by stretching the coil spring 332. (See FIG. 2). After the wands 78 and 80 are no longer in contact with the obstacle or the upward force exerted on the wands is less than the downward force exerted by the spring 332 acting through the leverage arm 330, the support rod 76 returns to its normal operating position whereby the stop arm 336 is in contact with the U-shaped rod support 67. The down force assembly thus eliminates or reduces unnecessary movement of the wands 78 and 80 and the corresponding rotational movement of the support rod 76.

While specific embodiments of the invention have been shown and described, it will be understood, of course, that the invention is not limited thereto since modifications may be made and other embodiments of the principles of this invention will occur to those skilled in the art to which this invention pertains. Therefore, it is contemplated by the appended claims to cover any such modifications and other embodiments as incorporate the features of this invention within the true spirit and scope of the following claims.

What is claimed is:

1. A guidance system for an agricultural implement comprising a sensing means for sensing the position of plants or other ground reference indicia, sensing support means for supporting the sensing means, a pivoting means for allowing relative horizontal pivotal movement between the sensing means and the sensing support means, said pivoting means defining a generally vertical pivot axis about which such horizontal pivotal movement occurs, a weight member for counterbalancing said sensing means, and means for adjusting the length of the effective counterbalance moment arm of said weight member relative to said pivot axis whereby the effect of gravity on the pivotal positioning of the sensing means when the guidance system is used in a sloping field is minimized.

2. The invention as in claim 1 wherein said sensing means includes at least one sensing wand.

3. The invention as in claim 2 and including a wand support structure for attaching said at least one sensing wand to said pivoting means.

4. The invention of claim 3 and including at least a portion of said support structure being so disposed on said opposite side of said pivot axis, and a weight member affixed to said support structure, whereby said at least one wand member is counterbalanced.

5. The invention as in claim 3 wherein said wand support structure comprises a wand support rod which is attached to at least one sensing wand, a rod support which is connected to the wand support rod, and a top plate which is attached to the rod support and the pivoting means.

6. The invention as in claim 1 wherein said sensing support means is said agricultural implement.

7. The invention as in claim 1 wherein said sensing support means is a bracket assembly attached to said agricultural implement.

8. The invention as in claim 7 wherein said bracket assembly comprises a first horizontal bracket which attaches to said agricultural implement, a second horizontal bracket which attaches to and is perpendicular to said first horizontal bracket, a vertical bracket which attaches to and is perpendicular to said second horizontal bracket and supports said pivoting means.

9. The invention as in claim 1 wherein said pivoting means comprises a collar and shaft wherein a portion of said shaft is located in said collar.

10. The invention as in claim 9 wherein said collar is attached to said sensing means and said shaft is attached to said sensing support means.

11. The invention as in claim 9 wherein said collar is attached to said sensing support means and said shaft is attached to said sensing means.

12. A guidance system for an agricultural implement comprising a sensing means for sensing the position of plants or other ground reference indicia, sensing support means for supporting the sensing means, a pivoting means for allowing relative horizontal pivotal movement between the sensing means and the sensing support means, said pivoting means defines a generally vertical pivot axis about which such horizontal pivotal movement occurs, said sensing means comprising at least one sensing wand extending generally in a direction radially away from said pivot axis on one said thereof, a want support structure for attaching said at least one sensing wand to said pivoting means, at least a portion of said support structure being so disposed on said opposite side of said pivot axis, and a weight member affixed to said support structure, and means for adjusting the length of the effective counterbalance moment arm of said weight member relative to said pivot axis.

13. The invention as in claim 12 wherein said wand support structure comprises a wand support rod which is attached to said at least one sensing wand, a rod support which is connected to the want support rod, and a top plate which is attached to the rod support and the pivoting means.

14. The invention as in claim 12 wherein said sensing support means is said agricultural implement.

15. The invention as in claim 12 wherein said sensing support means is a bracket assembly attached to said agricultural implement.

16. The invention as in claim 15 wherein said bracket assembly comprises a first horizontal bracket which attaches to said agricultural implement, a second horizontal bracket which attaches to and is perpendicular to said first horizontal bracket, a vertical bracket which attaches to and is perpendicular to said second horizontal bracket and supports said pivoting means.

17. The invention as in claim 12 wherein said pivoting means comprises a collar and shaft wherein a portion of said shaft is located in said collar.

18. The invention as in claim 17 wherein said collar is attached to said sensing means and said shaft is attached to said sensing support means.

19. The invention as in claim 17 wherein said collar is attached to said sensing support means and said shaft is attached to said sensing means.

20. A guidance system for an agricultural implement comprising a sensing means for sensing the position of plants or other ground reference indicia, sensing support means for supporting the sensing means, a pivoting means for allowing relative horizontal pivotal movement between the sensing means and the sensing support means, and a counterbalance means for counterbalancing the sensing means about said pivoting means when the guidance system is used in a sloping field wherein said counterbalance means comprises a support arm which is attached to said sensing means and a weight member which is attached to said support arm and said weight member can be moved to various locations along said support arm.

21. A guidance system for an agricultural implement comprising a sensing means for sensing the position of plants or other ground reference indicia, sensing support means for supporting the sensing means, a pivoting means for allowing relative horizontal pivotal movement between the sensing means and the sensing support means, and a counterbalance means for counterbalancing the sensing means when the guidance system is used in a sloping field wherein said counterbalance means can be adjusted to change the counterbalancing moment provided thereby.

22. The invention as in claim 21 wherein said counterbalance means comprises a weight member which is attached to the sensing means.

23. The invention as in claim 21 wherein said counterbalance means comprises a threaded shaft which is attached to the sensing means and a weight member which threadably engages said threaded shaft.

24. The invention as in claim 21 wherein said sensing support means is also the counterbalance means for counterbalancing the sensing means about said pivoting means.

25. The invention as in claim 21 wherein said pivoting means defines a generally vertical pivot axis about which such horizontal pivotal movement occurs, said sensing means comprising at least one sensing wand extending generally in a direction radially away from said pivot axis on one side thereof, and components joined to said at least one sensing wand and disposed on the opposite side of said pivot axis for counterbalancing said at least one sensing wand.

26. The invention as in claim 25 and including a wand support structure for attaching said at least one sensing wand to said pivoting means, at least a portion of said support structure being so disposed on said opposite side of said pivot axis for counterbalancing said at least one wand.

27. The invention of claim 26 and including a weight member affixed to said wand support structure, whereby said at least one wand member is counterbalanced.

28. The invention of claim 27 and including means for adjusting the length of the effective counterbalance moment arm of said weight member relative to said pivot axis.

29. The invention as in claim 21 wherein said sensing means includes at least one sensing wand.

30. The invention as in claim 21 wherein said sensing means comprises at least one sensing wand and a wand support structure for attaching at least one sensing wand to said pivoting means.

31. The invention as in claim 30 wherein said wand support structure comprises a wand support rod which is attached to said at least one sensing wand, a rod support which is connected to the wand support rod, and a top plate which is attached to the rod support and the pivoting means.

32. The invention as in claim 21 wherein said sensing support means is said agricultural implement.

33. The invention as in claim 21 wherein said sensing support means is a bracket assembly attached to said agricultural implement.

34. The invention as in claim 33 wherein said bracket assembly comprises a first horizontal bracket which attaches to said agricultural implement, a second horizontal bracket which attaches to and is perpendicular to said first horizontal bracket, a vertical bracket which attaches to and is perpendicular to said second horizontal bracket and supports said pivoting means.

35. The invention as in claim 21 wherein said pivoting means comprises a collar and shaft wherein a portion of said shaft is located in said collar.

36. The invention as in claim 35 wherein said collar is attached to said sensing means and said shaft is attached to said sensing support means.

37. The invention as in claim 35 wherein said collar is attached to said sensing support means and said shaft is attached to said sensing means.

38. A guidance system for an agricultural implement comprising a sensing means for sensing the position of plants or other ground reference indicia, sensing support means for supporting the sensing means, a pivoting means for allowing relative horizontal pivotal movement between the sensing means and the sensing support means, and a counterbalance means for counterbalancing the sensing means when the guidance system is used in a sloping field wherein said counterbalance means comprises a threaded shaft which is attached to the sensing means and a weight member which threadably engages said threaded shaft.

* * * * *

UNITED STATES PATENT AND TRADEMARK OFFICE
CERTIFICATE OF CORRECTION

PATENT NO. : 5,040,613
DATED : August 20, 1991
INVENTOR(S) : Dale R. Dodd, et al It is certified that error appears in the above-indentified patent and that said Letters Patent is hereby corrected as shown below:

Col. 3, line 50, delete the word "to' (second occurrence) and substitute therefor --or--.

Col. 7, line 60, delete "3!4" and substitute therefor --314--
line 63, delete "3!4" and substitute therefor --314--

Col. 11, line 20, delete the word "said" (second occurrence) and substitute therefor --side--.
line 21, delete the word "want" and substitute therefor --wand--.

Signed and Sealed this

Eighth Day of June, 1993

Attest:

MICHAEL K. KIRK

Attesting Officer     Acting Commissioner of Patents and Trademarks